United States Patent
Formby et al.

(10) Patent No.: US 10,904,075 B2
(45) Date of Patent: Jan. 26, 2021

(54) PRECONFIGURED FILTERS, DYNAMIC UPDATES AND CLOUD BASED CONFIGURATIONS IN A NETWORK ACCESS SWITCH

(71) Applicant: KEYSIGHT TECHNOLOGIES SINGAPORE (SALES) PTE. LTD., Singapore (SG)

(72) Inventors: Kevin Formby, Atlanta, GA (US); Gil Kaufman, Moultonborough, NH (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 313 days.

(21) Appl. No.: 13/933,838

(22) Filed: Jul. 2, 2013

(65) Prior Publication Data

US 2014/0012962 A1 Jan. 9, 2014

Related U.S. Application Data

(60) Provisional application No. 61/667,349, filed on Jul. 2, 2012.

(51) Int. Cl.
*G06F 15/16* (2006.01)
*H04L 12/24* (2006.01)

(52) U.S. Cl.
CPC ...... *H04L 41/0803* (2013.01); *H04L 41/0816* (2013.01)

(58) Field of Classification Search
CPC .................. H04L 41/0803; H04L 41/0816
USPC ....................................................... 709/220
See application file for complete search history.

(56) References Cited

U.S. PATENT DOCUMENTS

| 5,343,473 | A | 8/1994 | Cidon et al. |
| 5,867,763 | A | 2/1999 | Dean et al. |
| 5,983,270 | A * | 11/1999 | Abraham ............... H04L 29/06 709/224 |
| 6,130,887 | A | 10/2000 | Dutta |
| 6,434,624 | B1 * | 8/2002 | Gai ..................... H04L 41/0893 370/235 |
| 6,505,255 | B1 | 1/2003 | Akatsu et al. |
| 6,678,250 | B1 | 1/2004 | Grabelsky et al. |
| 6,814,510 | B1 | 11/2004 | Sabbagh et al. |
| 6,907,001 | B1 | 6/2005 | Nakayama et al. |

(Continued)

FOREIGN PATENT DOCUMENTS

| EP | 2 561 645 B1 | 2/2020 |
| WO | WO 2011/133711 A2 | 10/2011 |

OTHER PUBLICATIONS

Applicant-Initiated Interview Summary for U.S. Appl. No. 13/092,671 (dated Sep. 9, 2016).

(Continued)

*Primary Examiner* — Oscar A Louie
*Assistant Examiner* — Oluwatosin M Gidado

(57) ABSTRACT

Methods and systems for providing a configuration file on a network access switch that may be configured by a third party. A third party remotely defines a set of filters for the network access switch, absolving the user of any responsibility to update or configure the filters on the device. The configuration files may be stored and accessed remotely in the cloud. The system and method also provide for a simple software interface to facilitate easy implementation of the filters stored in the configuration files.

12 Claims, 2 Drawing Sheets

(56) References Cited

U.S. PATENT DOCUMENTS

| | | | |
|---|---|---|---|
| 7,286,652 B1 | 10/2007 | Azriel et al. | |
| 7,424,018 B2 | 9/2008 | Gallatin et al. | |
| 7,515,650 B1 | 4/2009 | Warner et al. | |
| 7,596,356 B2 | 9/2009 | Rofougaran et al. | |
| 7,769,873 B1 | 8/2010 | Mackie | |
| 7,835,348 B2* | 11/2010 | Kasralikar | H04L 63/1408 370/360 |
| 7,873,702 B2 | 1/2011 | Shen et al. | |
| 7,945,216 B2 | 5/2011 | Rakshani et al. | |
| 8,027,637 B1* | 9/2011 | Bims | H04B 7/022 455/16 |
| 8,098,677 B1* | 1/2012 | Pleshek | H04L 43/12 370/351 |
| 8,102,783 B1 | 1/2012 | Narayanaswamy et al. | |
| 8,134,927 B2 | 3/2012 | Gamage et al. | |
| 8,248,928 B1 | 8/2012 | Wang et al. | |
| 8,259,722 B1 | 9/2012 | Kharitonov | |
| 8,306,063 B2 | 11/2012 | Erdal et al. | |
| 8,386,937 B1* | 2/2013 | Gao | H04L 41/0853 715/734 |
| 8,446,916 B2 | 5/2013 | Aybay et al. | |
| 9,270,542 B2 | 2/2016 | Gamage et al. | |
| 9,571,296 B2 | 2/2017 | Nachum | |
| 9,806,968 B2 | 10/2017 | Matityahu et al. | |
| 9,898,781 B1* | 2/2018 | Silverman | G06Q 40/00 |
| 9,967,150 B2 | 5/2018 | Nachum | |
| 10,616,098 B2 | 4/2020 | Gamage et al. | |
| 2002/0073136 A1 | 6/2002 | Itoh et al. | |
| 2003/0144868 A1 | 7/2003 | MacIntyre et al. | |
| 2003/0172123 A1 | 9/2003 | Polan et al. | |
| 2004/0015613 A1 | 1/2004 | Ikeda | |
| 2004/0218609 A1* | 11/2004 | Foster | H04L 12/5692 370/401 |
| 2005/0282502 A1 | 12/2005 | Kursula et al. | |
| 2006/0174032 A1 | 8/2006 | Winchester et al. | |
| 2006/0223516 A1* | 10/2006 | Fan | G01D 4/006 455/418 |
| 2006/0294221 A1 | 12/2006 | Graupner et al. | |
| 2007/0177526 A1* | 8/2007 | Siripunkaw | H04L 12/2801 370/254 |
| 2007/0189272 A1 | 8/2007 | Hutchinson et al. | |
| 2008/0052784 A1 | 2/2008 | Wiley et al. | |
| 2008/0104236 A1* | 5/2008 | Yoshikawa | H04L 41/00 709/224 |
| 2008/0147831 A1* | 6/2008 | Redjaian | G06F 21/57 709/222 |
| 2008/0153541 A1 | 6/2008 | Rakshani et al. | |
| 2008/0170561 A1 | 7/2008 | Halbraich et al. | |
| 2008/0190639 A1 | 8/2008 | Baran et al. | |
| 2008/0215477 A1* | 9/2008 | Annunziata | G06Q 40/04 705/37 |
| 2009/0182874 A1 | 7/2009 | Morford et al. | |
| 2009/0190589 A1 | 7/2009 | Bains et al. | |
| 2010/0135164 A1 | 6/2010 | Rofougaran | |
| 2010/0228854 A1 | 9/2010 | Morrison et al. | |
| 2011/0026406 A1 | 2/2011 | Gamage et al. | |
| 2011/0026521 A1 | 2/2011 | Gamage et al. | |
| 2011/0103259 A1* | 5/2011 | Aybay | H04L 49/35 370/254 |
| 2011/0103595 A1 | 5/2011 | Ramaswamy et al. | |
| 2011/0264797 A1 | 10/2011 | Matityahu et al. | |
| 2012/0124257 A1* | 5/2012 | Wu | H01L 25/18 710/106 |
| 2012/0181540 A1 | 7/2012 | Udagawa et al. | |
| 2012/0317224 A1* | 12/2012 | Caldwell | H04W 24/00 709/217 |
| 2013/0010605 A1 | 1/2013 | Jocha et al. | |
| 2013/0272135 A1 | 10/2013 | Leong | |
| 2013/0336240 A1* | 12/2013 | Cherian | H04W 76/025 370/329 |
| 2014/0181267 A1 | 6/2014 | Wadkins et al. | |
| 2015/0009994 A1 | 1/2015 | Keesara et al. | |
| 2015/0029846 A1 | 1/2015 | Liou et al. | |
| 2015/0055720 A1 | 2/2015 | Lin et al. | |
| 2015/0113133 A1 | 4/2015 | Srinivas et al. | |
| 2015/0113143 A1 | 4/2015 | Stuart et al. | |
| 2015/0319049 A1 | 11/2015 | Nachum | |
| 2015/0319070 A1 | 11/2015 | Nachum | |
| 2016/0057039 A1 | 2/2016 | Htay et al. | |
| 2016/0226752 A1 | 8/2016 | Gamage et al. | |

OTHER PUBLICATIONS

Final Office Action for U.S. Appl. No. 14/266,668 (dated Aug. 25, 2016).

Non-Final Office Action for U.S. Appl. No. 13/092,671 (dated Jun. 2, 2016).

Notice of Allowance for U.S. Appl. No. 14/266,660 (dated May 13, 2016).

Non-Final Office Action for U.S. Appl. No. 14/266,668 (dated Feb. 1, 2016).

Commonly-assigned, co-pending Continuation U.S. Appl. No. 15/012,801 for "Apparatus and Methods for Forwarding Data Packets Captured From a Network," (Unpublished, filed Feb. 1, 2016).

Notice of Allowance for U.S. Appl. No. 14/266,660 (dated Jan. 21, 2016).

Extended European Search Report for European Patent Application No. 11772665.3 (dated Oct. 1, 2015).

Non-Final Office Action for U.S. Appl. No. 14/266,660 (dated Sep. 18, 2015).

Notice of Allowance and Fee(s) Due and Exmainer-Initiated Interview Summary for U.S. Appl. No. 12/533,957 (dated Aug. 7, 2015).

Non-Final Office Action for U.S. Appl. No. 12/533,957 (dated Nov. 17, 2014).

Final Office Action for U.S. Appl. No. 13/092,671 (dated Nov. 6, 2014).

Non-Final Office Action for U.S. Appl. No. 13/092,671 (dated Apr. 23, 2014).

Final Office Action for U.S. Appl. No. 12/533,957 (dated Feb. 28, 2014).

Interview Summary for U.S. Appl. No. 12/533,957 (dated Jan. 24, 2014).

"OpenFlow Switch Specification," Open Networking Foundation, Version 1.4.0 (Wire Protocol 0x05), pp. 1-206 (Oct. 14, 2013).

Non-Final Office Action for U.S. Appl. No. 12/533,957 (dated Sep. 12, 2013).

Final Office Action for U.S. Appl. No. 13/092,671 (dated May 23, 2013).

Selecting the Right VERAstreamTM Product, DATACOM Systems Inc, p. 1-1 (May 14, 2013).

Final Office Action for U.S. Appl. No. 12/533,957 (dated Jan. 2, 2013).

Non-Final Office Action for U.S. Appl. No. 13/092,671 (dated Nov. 9, 2012).

Non-Final Office Action for U.S. Appl. No. 12/533,957 (dated May 11, 2012).

"Smart Taps Getting Smarter," Networking, Network Computing New, http://www.networkcomputing.com/networking/smart-taps-getting-smarter/1797861399, pp. 1-2 (Mar. 22, 2012).

"Command Today's Complex Data Center Challenges," Data Center, Net Optics Data Sheet, Net Optics Inc., pp. 1-4 (2011).

Notification of Transmittal of the International Search Report and the Written Opinion of the International Searching Authority, or the Declaration for International Application No. PCT/US2011/033313 (dated Nov. 30, 2011).

Notice of Allowance and Fee(s) Due for U.S. Appl. No. 12/533,951 (dated Nov. 8, 2011).

Final Office Action for U.S. Appl. No. 12/533,957 (dated Oct. 31, 2011).

Interview Summary for U.S. Appl. No. 12/533,957 (dated Aug. 31, 2011).

Non-Final Office Action for U.S. Appl. No. 12/533,957 (Aug. 2, 2011).

Interview Summary for U.S. Appl. No. 12/533,951 (dated Jul. 28, 2011).

(56) References Cited

OTHER PUBLICATIONS

Non-Final Office Action for U.S. Appl. No. 12/533,951 (dated Feb. 18, 2011).
Agilent Technologies, "Agilent N2X: The Industry's Most Comprehensive Multiservices Test Solution for Converging Network Infrastructures," 5989-1244EN, pp. 1-6 (Feb. 1, 2006).
Agilent Technologies, "Agilent N2X PITV Quality of Experience Test Solution," N5570A and E7877A Technical Data Sheet, 5989-3440EN, pp. 1-12 (Jul. 21, 2006).
Agilent Technologies, "True Router Performance Testing: Agilent Technologies Router Tester Application Note," 5980-1421E, Rev. A, pp. 1-8 (May 2000).
Letter from Ixia to Agilent Technologies re: Notice of Indemnification Claims/Dispute pp. 1-2 (Nov. 9, 2010).
Letter from Agilent Technologies to Ixia re: Notice of Indemnification Claims/Dispute, pp. 1-2 (Oct. 28, 2010).
Letter from Ixia to Agilent Technologies re Notice of Erroneously Assigned Patent Applications and Request for Executed Assignment, pp. 1-2 (Oct. 22, 2010).
Letter from Agilent Technologies to Ixia re: Notice of Erroneously Assigned Patent Application and Request for Executed Assignment, pp. 1-2 (Oct. 8, 2010).
"Radware's Smart IDS Management, FireProof and Intrusion Detection System, Deployment and ROI," Radware, Inc. pp. 1-9 (Aug. 21, 2002).
Edwards, "Vulnerabilities of Network Intrusion Detection Systems: Realizing and Overcoming the Risks, the Case for Flow Mirroring," Top Layer Networks, pp. 1-18 (May 1, 2002).
Notice of Decision from Post-Prosecution Pilot Program (P3) Conference for U.S. Appl. No. 14/266,668 (dated Dec. 22, 2016).
Final Office Action for U.S. Appl. No. 13/092,671 (dated Dec. 16, 2016).
Non-Final Office Action for U.S. Appl. No. 15/012,801 (dated Dec. 13, 2016).
Notice of Allowance and Fee(s) Due for U.S. Appl. No. 14/266,660 (dated Oct. 13, 2016).
Notice of Allowance and Examiner Initiated Interview Summary for U.S. Appl. No. 13/092,671 (dated Jul. 20, 2017).
Final Office Action for U.S. Appl. No. 15/012,801 (dated Jun. 2, 2017).
Non-Final Office Action for U.S. Appl. No. 14/266,668 (dated May 5, 2017).
Advisory Action and Examiner Initiated Interview Summary for U.S. Appl. No. 13/092,671 (dated Mar. 13, 2017).
Notice of Allowance and Fee(s) Due and Examiner-Initiated Interview Summary for U.S. Appl. No. 14/266,668 (dated Dec. 27, 2017).
Notice of Panel Decision from Pre-Appeal Brief Review for U.S. Appl. No. 15/012,801 (dated Oct. 25, 2017).
Communication pursuant to Article 94(3) EPC for European Patent Application Serial No. 11 772 665.3 (dated Apr. 4, 2019).
Notice of Allowance for U.S. Appl. No. 14/266,668 (dated Apr. 9, 2018).
Examiner's Answer for U.S. Appl. No. 15/012,801 (dated Mar. 27, 2018).
Notice of Allowance and Fee(s) Due for U.S. Appl. No. 15/012,801 (dated Jan. 8, 2020).
Decision on Appeal for U.S. Appl. No. 15/012,801 (dated Oct. 10, 2019).
Decision to grant a European patent pursuant to Article 97(1) EPC for European Patent Application Serial No. 11772665.3 (dated Jan. 30, 2020).

* cited by examiner

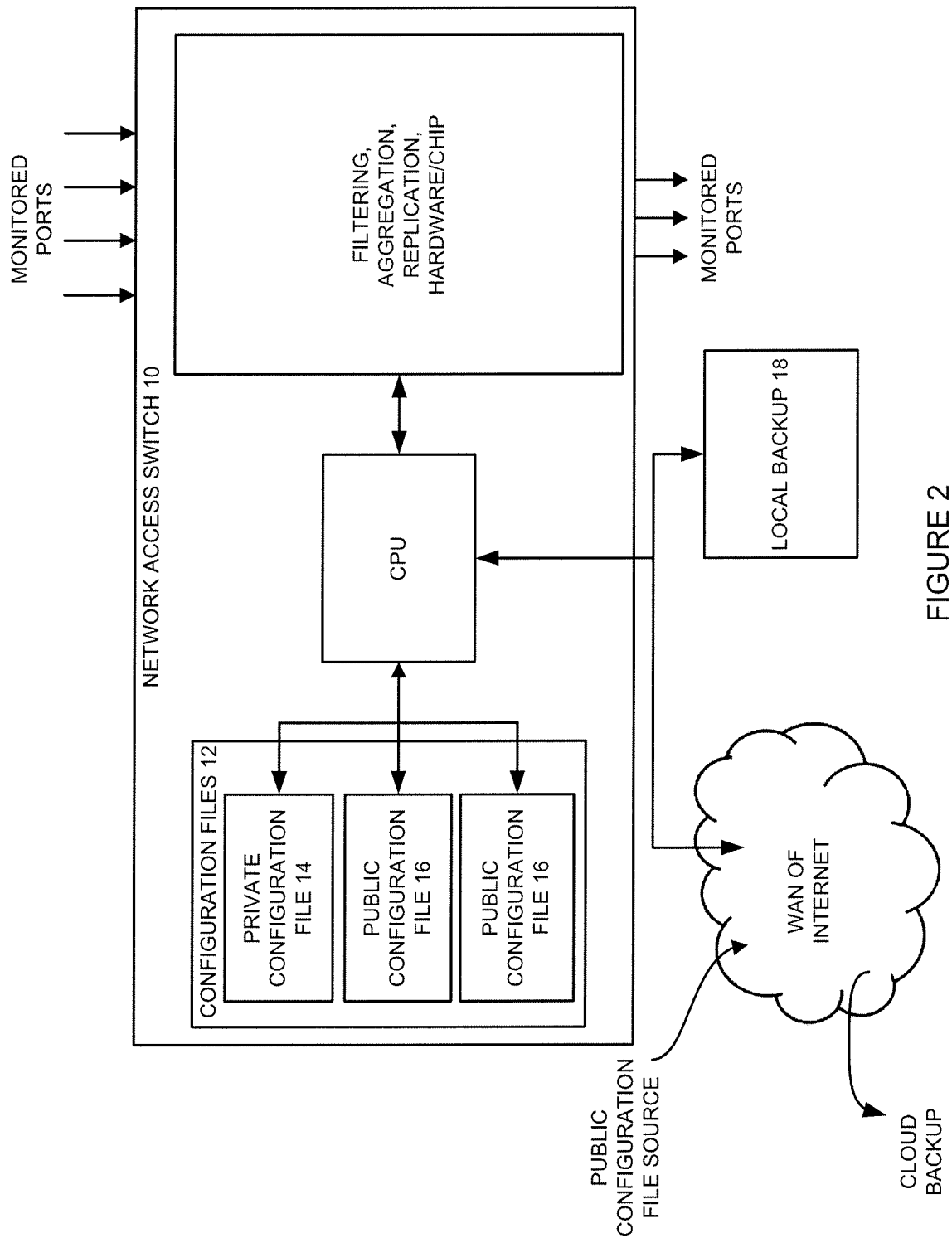

PRECONFIGURED FILTERS, DYNAMIC UPDATES AND CLOUD BASED CONFIGURATIONS IN A NETWORK ACCESS SWITCH

CROSS-REFERENCE TO RELATED APPLICATIONS

The present application claims priority to U.S. Provisional Patent Application No. 61/667,349, filed on Jul. 2, 2012.

BACKGROUND OF THE INVENTION

1. Field of the Invention

The present invention relates to network access switch architectures, and more particularly, to a system that allows for the easy construction and updating of filters on a network access switch.

2. Description of the Related Art

Access switches are often used to assist in the monitoring of telecommunication links. Taps or span ports are used to feed traffic to Access Switches. The Access Switches then filter and direct the traffic to the correct monitoring devices such as intrusion detection systems (IDS) or traffic monitoring and analytical devices. Typical deployments are shown in FIG. 1.

Filters can be based on a number of different parameters such as protocol type (eg. UDP or TCP), destination or source addresses (be they layer 2 (MAC) or layer 3 (IP) addresses), and even specific bits within the payload data packets. Filters can also be assigned names chosen by users and which typically define the role of the filter, for example: "Voice over IP traffic on LAN port number 1." End users can also construct complex logical Boolean filters based on the above parameters.

However, the construction of such complex filters can be both complex, tedious, time consuming and prone to errors. Once the filters have been defined they are typically stored in a "configuration file" that is stored within the firmware of a specific network Access Switch. Accordingly, there is a need in the art for simple, accurate construction of filters on network access switches.

Within the financial services industry there are particular challenges due to the large number of destination IP addresses used to define various traded instrument ranges within multicast data feeds that are published by major stock exchanges and execution venues. Major stock exchanges can have hundreds of IP addresses that are mapped to specific traded instruments. Different ranges can apply to production versus test feeds, and feeds originating from different data centers may also have multiple addresses. Companies who wish to set up their network Access Switches to filter on given financial instruments or for specific exchanges face significant logistical challenges in keeping track of all these parameters and ensuring that the filters are correctly defined. In addition it is not unusual for major stock exchanges to change their IP address ranges and their mappings to traded instruments on a regular basis. This again can cause logistical issues as these changes have to be tracked and then modifications made to the filters. Accordingly, there is a need in the art to reduce administration resources and costs with a network access switch that can simply track the changes to IP addresses made by major stock exchanges and execution venues.

BRIEF SUMMARY OF THE INVENTION

The present invention provides a method for defining a set of filters on a network access switch, comprising the steps of providing a network access switch having access to a configuration file for defining filters based on received data; limiting remote access to the configuration file to at least a single third party; receiving from the third party data defining a set of filters; and storing the data representing a set of filters within the configuration file.

According to another aspect, a user may not locally or remotely access the configuration file.

According to another aspect, the access switch has a second configuration file, and further comprises the steps of: receiving from the user data defining a set of filters; and storing the data representing a set of filters within the second configuration file.

According to another aspect, the third party is a manufacturer of the network access switch.

According to another aspect, the third party is a service provider.

According to another aspect the filter filters incoming network data based on trade type.

According to another aspect, the configuration file is stored on a remote server where it may accessible to the network access switch.

According to another aspect, the method further comprises the steps of providing a software interface to the network access switch; selecting a filter from set the filters stored within the configuration file with the software interface; and implementing the selected filter on the network access switch.

According to another aspect, the step of receiving occurs at a time of user's election.

According to another aspect, further comprising, after the step of limiting, the step of purchasing from the party data defining a set of filters.

According to an aspect, a system for filtering network traffic, comprising a network access switch having a configuration file, wherein the configuration file may be remotely accessed and programmed by at least a single third party to define a set of filters.

According to another aspect, a user of the network access switch may not access or program the configuration file.

According to another aspect, the system further comprises a second configuration file, wherein the configuration file may be accessed and programmed by a user to define a set of filters.

According to another aspect, the third party is the manufacturer of the network access switch.

According to another aspect, the third party is a service provider.

According to another aspect, the filter filters based on trade type.

According to another aspect, the configuration file is stored on a remote server.

According to another aspect, the system further comprises a software interface to the network access switch, wherein the software interface allows the user to select a filter from the set of filters to be implemented on the network access switch.

According to another aspect, the set of filters is purchased by a user.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 2 is a schematic view of an embodiment of the present invention.

DETAILED DESCRIPTION OF THE INVENTION

Figure 1:
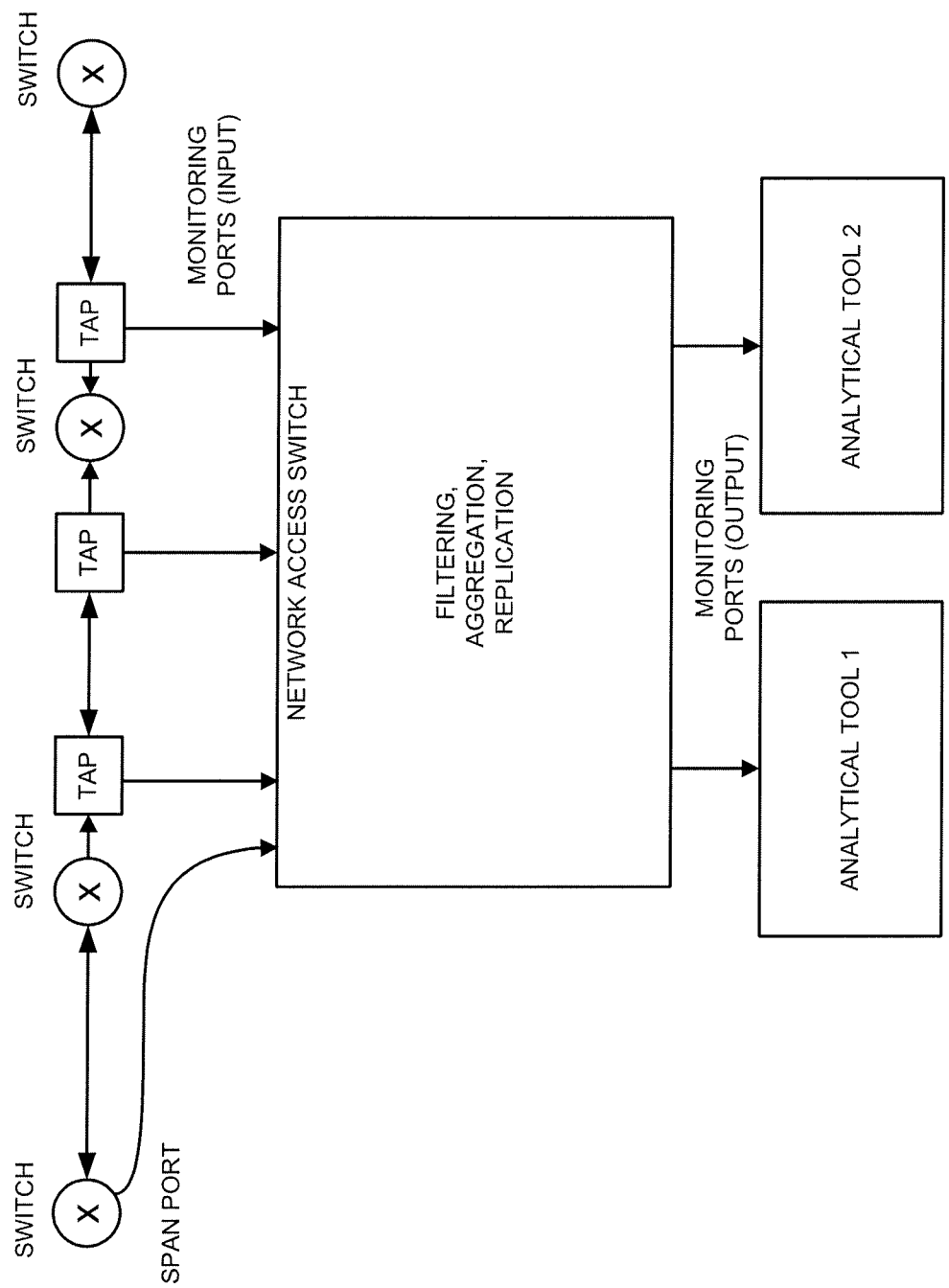
FIG. 1 is a typical deployment of a network access switch.

Referring now to the drawings, wherein like reference numerals refer to like parts throughout, there is seen in FIG. 2 a schematic of a new architecture for a network access switch according to an embodiment of the present invention. The new architecture provides two or more configuration files 12 to be located within network access switch 10. The first allows standard user defined filters. Configuration files 16 following the user defined filter, are made up of filters that are defined centrally by a third party and can be remotely updated from a central server. The first configuration file 14 can be thought of as a 'private configuration file', while the others are 'public configuration files'. Public configuration files 16 are based around groups of closely associated filters. For example, 'Financial Trading', contains all filters associated with major stock exchange feeds and trading applications that use multicast or FIX messaging. 'Voice and Video' contains all filters associated with common applications with voice and video application monitoring.

Configuration files 12 contain all the relevant information for a user of network Access Switch 10 to readily define which traffic can be forwarded or blocked within a filter. The user may configure the filters by selecting from simple drop down menus or drag and drop type operations rather than composing complex technical filter expressions based on IP addresses or other parameters.

FIG. 2 also shows how configuration files 12 are related of the network Access Switch.

For example, if the Financial Trading Configuration file is loaded and the user wished to forward the NSYE BBO Production Line A Symbols A-C traffic, the user would select "NYSE_BBO_Production_LineA_Symbols_A-C_" in a drop down menu, rather than looking up the destination IP address of the multicast group associated with this feed in a large spreadsheet and then manually entering this as ip.dst==224.0.5.221 AND udp.port==8221.

All the required filter configuration data and logical Boolean constructs are located within public configuration files 16. Public configuration files 16 also contain the user-friendly names and relationships of the filtered objects as well as descriptions of them. Sophisticated filtering based on parameters that are relevant to the trading application can also be made, for example the filters may filter by trade type or instrument.

Although the user of the device may back up private configuration file 14 on a local backup 18, public configuration file 16 cannot be altered and adjusted by the end user. However, public configuration file 16 can be updated on a regular basis by an autonomous process controlled by either the manufacturer of the hardware or a third party service provider. Alternatively, to account for security concerns by some users, a semi manual process can be used whereby the end user manually loads new public configuration file 16.

End users can choose to store both types of their backup configuration files 12 locally, but there is little point in doing so for public configuration file 16 as these are available from either the supplier or a third party service provider. The ability to store private configuration files off site and accessible via the internet (as a cloud based service) is also possible.

Filters may also be sold by manufacturers or service providers, and purchased by end users.

Although most of the above examples concern financial services applications, this embodiment can also be used in other applications as well.

What is claimed is:

1. A method for defining filters on a network access switch, comprising:

providing a network access switch that connects to at least one network tap and at least one span port, receives and filters traffic from the at least one network tap and span port, and directs the filtered traffic to network monitoring devices, the network access switch comprising a first configuration file for defining filters based on received data, wherein said filters in said first configuration file include filters for identifying and forwarding tapped traffic having destination Internet protocol (IP) addresses of multicast groups corresponding to real time traded instrument multicast data feeds of symbols and bid and ask quotes for alphabetic ranges of traded instruments published by stock exchanges and execution venues, and wherein the filters include a filter containing a destination IP address of a multicast group corresponding to one of the real time traded instrument feeds of symbols and bid and ask quotes for alphabetic ranges of traded instruments published by one of said stock exchanges or execution venues; and using an autonomous process to update said filters within said first configuration file to track changes in mappings between said traded instruments and said IP addresses, the changes in the mappings including changes made by stock exchanges and execution venues in IP addresses associated with multicast data feeds published by the stock exchanges and execution venues, and wherein said network access switch uses said destination IP addresses to forward traffic to said multicast groups and wherein using said autonomous process to update said filters comprises providing a drop down menu having an identifier for a stock data feed mapped to a destination IP address of a multicast group, receiving selection of the identifier, and configuring the network access switch to forward traffic to the destination IP address of the multicast group.

2. The method of claim 1, wherein said filters in said first configuration file include filters that filter incoming network data based on trade type.

3. The method of claim 1, wherein said first configuration file is stored on a remote server where it is accessible to said network access switch.

4. The method of claim 1, further comprising:

providing a software interface to said network access switch;

selecting a filter from said filters stored within said first configuration file with said software interface; and implementing said selected filter on said network access switch.

5. The method of claim 1, wherein said network access switch comprises a second configuration file manually updatable by an end user, and the method further comprises receiving, by the end user, data defining a set of filters and the receiving occurs at a time of said end user's election.

6. The method of claim 1, further comprising, limiting access to said filters in said first configuration file to a third party, and, after the limiting, purchasing from said third party data defining a set of filters.

7. A system for filtering network traffic, comprising:
a network access switch that connects to at least one network tap and at least one span port, receives and filters traffic from the at least one network tap and span port, and directs the filtered traffic to network monitoring devices, the network access switch comprising:
a first configuration file, wherein said first configuration file is remotely accessible and programmable to define a set of filters, wherein said filters in said first configuration file include filters for tapping and forwarding traffic having destination Internet protocol (IP) addresses of multicast groups corresponding to traded instrument multicast data feeds of symbols and bid and ask quotes for alphabetic ranges of traded instruments published by stock exchanges and execution venues,
wherein said filters for tapping and forwarding traffic having destination IP addresses of multicast groups corresponding to traded instrument multicast data feeds of symbols and bid and ask quotes for alphabetic ranges of traded instruments published by stock exchanges and execution venues include a filter containing a destination IP address of a multicast group corresponding to one of the real time traded instrument feeds of symbols and bid and ask quotes for alphabetic ranges of traded instruments published by one of said stock exchanges or execution venues, and wherein said filters within said first configuration file are updatable using an autonomous process to track changes in said destination IP addresses of said multicast groups corresponding to real time traded instrument multicast data feeds of symbols and bid and ask quotes for alphabetic ranges of traded instruments published by stock exchanges and execution venues, the changes in the mappings including changes made by said stock exchanges and execution venues in said destination IP addresses of said multicast groups corresponding to said traded instrument multicast data feeds of symbols and bid and ask quotes for alphabetic ranges of traded instruments published by the stock exchanges and execution venues, and wherein said network access switch uses said destination IP addresses to forward traffic to said multicast groups and wherein using said autonomous process to update said filters comprises providing a drop down menu having an identifier for a stock data feed mapped to a destination IP address of a multicast group, receiving selection of the identifier, and configuring the network access switch to forward traffic to the destination IP address of the multicast group.

8. The system of claim 7, wherein said filters in said first configuration file include filters that filter incoming network data based on trade type.

9. The system of claim 7, wherein said first configuration file is stored on a remote server accessible to said network access switch.

10. The system of claim 7, further comprising a software interface to said network access switch, wherein said software interface allows an end user to select a filter from said set of filters in said first configuration file to be implemented on said network access switch.

11. The system of claim 7, wherein said network access switch comprises a second configuration file updatable by an end user, said second configuration file being accessible at a time of said end user's election.

12. The system of claim 7, wherein said set of filters in said first configuration file is purchased by a user.

* * * * *